Dec. 9, 1941.　　　A. J. AMBERG　　　2,265,506
CARRIER AND FASTENING DEVICE FOR PAPERS OR THE
LIKE, AND METHOD OF MAKING THE SAME
Filed Aug. 3, 1940
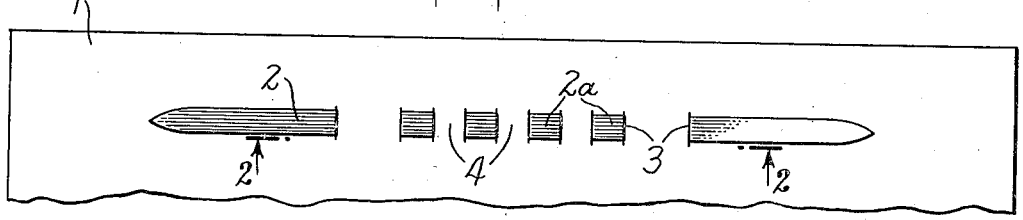
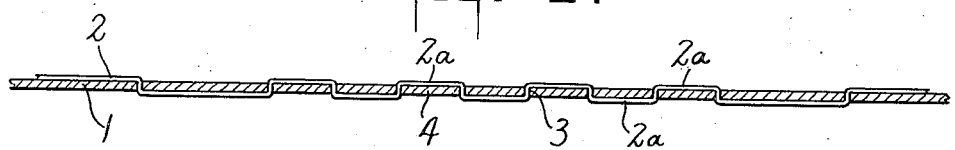
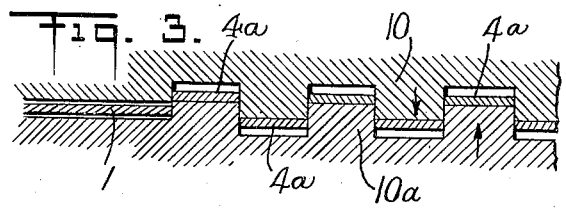
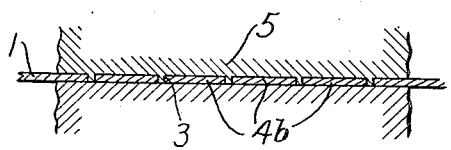
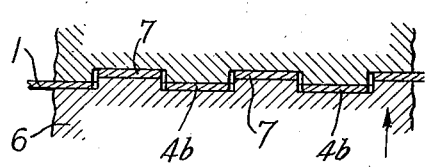
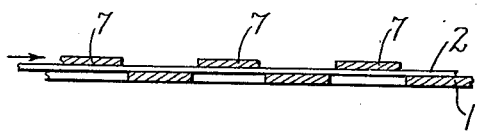
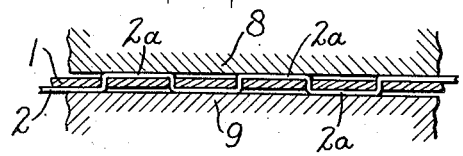
INVENTOR
*Arthur J. Amberg*
BY
*Blair, Curtis + Hayward*
ATTORNEYS Patented Dec. 9, 1941

2,265,506

UNITED STATES PATENT OFFICE 2,265,506

CARRIER AND FASTENING DEVICE FOR PAPERS OR THE LIKE, AND METHOD OF MAKING THE SAME

Arthur J. Amberg, Montclair, N. J., assignor to A. J. Amberg Business Equipment Corporation, New York, N. Y., a corporation of New York Application August 3, 1940, Serial No. 350,369

3 Claims. (Cl. 129—25)

This invention relates to a cover or carrier and fastening device for papers or the like and to a method of making the same. The product is conveniently embodied in file boards, file holders, brief covers or the like to which one or more papers may be fastened, as for filing or carrying.

Heretofore widely used devices for a similar purpose have included covers or carrier sheets of fibrous material fitted with flexible metal clips or fastening members to retain papers or the like at one side of the cover or carrier. In some types of these devices the fastener or clip is retained on the carrier by a locking or base plate or other extraneous member which usually protrudes from the rear face of the carrier sheet and thus interferes with easy filing and handling even when patches of cloth or other suitable material are employed to cover the protruding part. Also, such constructions unduly increase the overall thickness of the cover or carrier over the area occupied by the fastening device.

One object of the present invention is to provide a simplified cover or carrier of fibrous or other suitable material and having a fastening device for papers or the like permanently secured to the carrier without the aid of any extraneous locking means and presenting a minimum of increased thickness at that portion occupied by the fastening device and with no undue extension thereof beyond the exposed surface of the carrier.

A further object has been to provide a simple and effective method of making such a carrier device. Said method includes in general deforming portions of a fibrous cover or carrier sheet or base to form embossments therein, providing aligned openings or slits between said embossments, engaging portions of a suitable fastener element or clip, such for example, as a length of flexible or pliable metal, with said openings and said embossments, and then pressing said deformed portions toward normal flat condition and thereby deforming engaged portions of the clip to hold the latter on the carrier sheet.

Other objects and advantages of the invention will appear from the following description of preferred embodiments thereof and from the appended drawing wherein—

Figure 1 is a plan view of a portion of a carrier device;

Figure 2, an enlarged longitudinal section on the line 2—2 of Figure 1;

Figure 3, a diagrammatic view showing a combined embossing and slit cutting step wherein alternate embossments are made in opposite directions;

Figure 3a, a diagrammatic view showing, as a modification, a separate slit punching step;

Figure 4, a diagrammatic view showing a deforming or embossing step applied to a blank having slits produced as in Figure 3a and wherein embossments, alternating with undeformed barriers, are made to extend in the same direction;

Figure 5, a diagrammatic view showing a clip inserting step; and

Figure 6, a diagrammatic view showing the step of pressing the embossments toward flat condition and deforming the clip.

The embodiment of my invention illustrated in Figures 1 and 2 includes a carrier sheet 1 preferably of fibrous material, as stiff paper, cardboard, fiberboard or the like, and a pliable fastener element or clip 2, preferably a narrow strip of metal such as soft tinned steel or soft brass approximately between .01 inch and 0.15 inch in thickness, which is permanently secured to carrier sheet 1 by engagement of deformed portions 2a thereof with a series of slits 3 and barriers 4. A substantial portion of said clip 2 is left free at each end thereof to provide prongs for retaining papers or the like.

In making the devices above described, the carrier sheet 1 is deformed between dies 10 and 10a, Figure 3, to form the series of slits 3 with alternating embossments 4a in opposite directions, said slits and embossments providing a passageway through which to insert a clip as hereinafter described.

In a modified procedure, the carrier sheet 1 is punched or cut by a cutter punch 5 to provide said series of slits 3 and barriers 4b, Figure 3a; and portions of said carrier sheet, as alternate barriers between slits 3, are deformed in one direction by a press punch 6 to form embossments as 7 alternating with barriers 4b, Figure 4, and which project beyond an adjacent surface of the carrier sheet 1.

A suitable fastener element, as the metal clip 2 above described, is slid endwise in unbent condition, Figure 5, into and through the opening or series of aligned openings provided by slits and the embossments 7, Figure 4, produced as in Figure 4 or by slits and the embossments 4a produced as shown in Figure 3, to a position with its free ends extending beyond the ends of the series of slits and embossments. The clip 2 is clamped into its permanent assembled position by pressing the embossments as 4a or 7 and the clip 2 between suitable dies, as 8 and 9, Figure 6, whereby said embossments are pressed toward their original flat positions and portions 2a of clip 2 are deformed to a zigzag longitudinal sectional contour.

Where the above described method is employed, the assembly of the carrier sheet 1 and the clip 2 is extremely simple and very economical, as compared to other known devices for a similar purpose. And the finished product provides a holding or filing device which has all the utility of known devices for a similar purpose with the further advantage that it occupies a smaller part of the filing space. Also the device of the present invention presents no edges or plates protruding from the rear of the carrier sheet to interfere with its handling. The advantages of this invention are especially realized when it is embodied in a device wherein the carrier sheet is of hard pressed card or fibreboard so tough that it can take embossments and be subjected to necessary pressure without substantial weakening of the material thereof or adjacent thereto during manufacture as above described.

I claim:

1. Method of making a carrier or file for papers or the like which includes the steps of deforming a sheet of stiff fibrous material to form a series of oppositely directed successively arranged embossments alternating with slits, interposing a fastener strip through said slits to a position with portions opposite said embossments, and pressing said embossments toward their original undeformed position and thereby deforming portions of said strip.

2. Method of making a carrier or file for papers or the like which includes the steps of pressing portions of a sheet of stiff fibrous material out of flat relation to form slits and oppositely directed embossments between said slits, positioning a pliable fastener strip in engagement with said slits and embossments, and pressing the sheet to flatten said embossments and deform portions of said strip engaged therewith.

3. Method of making a carrier or file for papers or the like which includes the steps of pressing portions of a sheet of stiff fibrous material to form slits and barriers alternating with embossments, inserting a fastener strip in said slits with portions thereof opposite said embossments and other portions opposite said barriers, and pressing said embossments toward the level of said barriers to deform said portions of said strip.

ARTHUR J. AMBERG.